United States Patent [19]

Inoue et al.

[11] 4,405,227

[45] Sep. 20, 1983

[54] PHOTOGRAPHIC APPARATUS

[75] Inventors: Syunzo Inoue, Yokohama; Toshio Arai, Kawasaki; Takeshi Nagasawa; Motofumi Konishi, both of Yokohama; Hitoshi Yanagawa, Tokyo; Toshio Iwaya, Machida; Michio Kasuya, Fuchu, all of Japan

[73] Assignee: Canon Kabushiki Kaisha, Tokyo, Japan

[21] Appl. No.: 366,068

[22] Filed: Apr. 6, 1982

Related U.S. Application Data

[63] Continuation of Ser. No. 114,890, Jan. 24, 1980, abandoned.

[30] Foreign Application Priority Data

| Feb. 9, 1979 | [JP] | Japan | 54-14631 |
| Feb. 9, 1979 | [JP] | Japan | 54-14632 |
| Feb. 9, 1979 | [JP] | Japan | 54-14633 |
| Feb. 9, 1979 | [JP] | Japan | 54-14634 |

[51] Int. Cl.³ .................. G03B 27/32; G03B 27/52
[52] U.S. Cl. .................................................. 355/27
[58] Field of Search .................................. 355/27, 28

[56] References Cited

U.S. PATENT DOCUMENTS 3,557,675  1/1971  Koll et al. .................... 355/27
4,136,946  1/1979  Nishimoto .................... 355/28
4,158,496  6/1979  Cieplik .
4,272,185  6/1981  Arai et al. .

FOREIGN PATENT DOCUMENTS 1254952  1/1961  France .................... 355/27
47-11393  10/1972  Japan .

Primary Examiner—Monroe H. Hayes
Attorney, Agent, or Firm—Fitzpatrick, Cella, Harper & Scinto

[57] ABSTRACT

A photographic apparatus for photographing originals in succession onto a photographic film of a continuous web form and then processing the thus exposed film. The apparatus is provided with a storage chamber located between the photographing station and the processing station for temporarily storing the film advanced from the photographing station, a feeder for feeding the film from the storage chamber to the processing station and a switch for actuating the feeder to feed the film from the storage chamber to the processing station. There are further provided a photographing controller adapted to prohibit the operation of the photographing device when a determined amount of the film is stored in the storage chamber and enable the photographing operation in response to the actuation of said switch, and a cutter for cutting the exposed film.

8 Claims, 6 Drawing Figures

PHOTOGRAPHIC APPARATUS

This is a continuation of application of Ser. No. 114,890, filed Jan. 24, 1980, now abandoned.

BACKGROUND OF THE INVENTION

1. Field of the Invention

The present invention relates to a photographic apparatus for photographing originals in succession on a photographic film of a continuous web form and processing the thus exposed film to obtain a film with visible recorded images.

2. Description of the Prior Arts

In such photographic apparatus, the photographic film is advanced intermittently for every photographing operation at the photographing station where the film is exposed to the original images, while said film after exposure is continuously advanced at a constant speed in the processing station in order to prevent uneven development. Consequently, in order to achieve satisfactory operation of these two stations it becomes necessary to adjust the difference in the film feeding speed between these two stations. For this reason, in the conventional apparatus there is provided a storage chamber between the two stations for temporarily storing the exposed film, and a cutter is actuated by a cutting instruction switch when a determined amount of film is stored in said storage chamber whereupon the film thus cut (hereinafter referred to as strip film) is advanced in continuous manner from the storage chamber to the processing station thereby avoiding the above-mentioned inconvenience resulting from the difference in the feed speed between the two stations.

However, in such photographic apparatus the amount of originals which can be recorded on a strip film is determined since the maximum length of the strip film is fixed by the dimension of the storage chamber. Consequently the originals in excess of said amount have to be recorded on plural film strips. Such plural strips have to be spliced together for use on a reader or a reader-printer with a retrieving function, involving the danger of erroneous splicing or misplacing. The maximum number of originals recordable on a strip film can be increased by enlarging the dimension of said storage chamber, but such modification will lead to a larger apparatus.

SUMMARY OF THE INVENTION

The object of the present invention, therefore, is to provide a photographic apparatus not having the above-mentioned drawbacks.

Another object of the present invention is to provide a photographic apparatus capable of providing a strip film of arbitary length, thus allowing recording of an arbitrary number of originals on a single strip of film.

Still another object of the present invention is to provide a photographic apparatus allowing efficient and independent operation of the photographing station and the processing station with a relatively small storage chamber.

Still other objects and advantages of the present invention will be made apparent from the following description of the preferred embodiments of the present invention.

DESCRIPTION OF THE PREFERRED EMBODIMENTS

Figure 1:
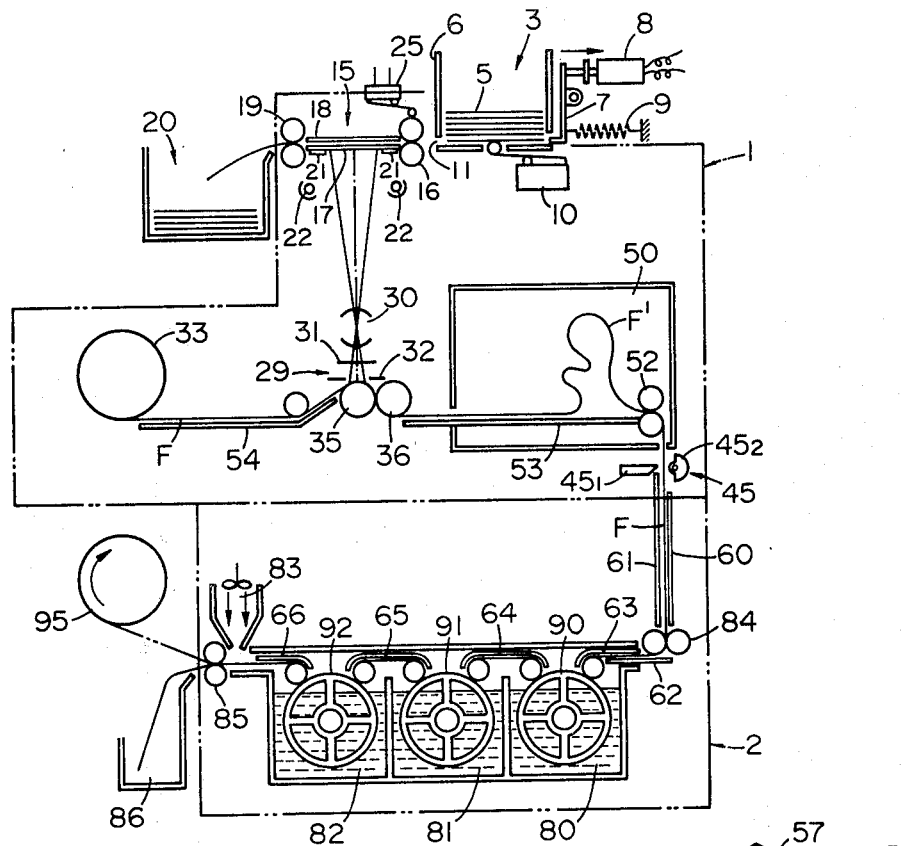
FIG. 1 is a schematic view of a processor-camera showing a first embodiment of the present invention.

FIG. 1 shows a processor-camera embodying the present invention and comprising a camera unit 1 for photographing a plurality of originals in succession on a photographic film of a continuous web form and a processing unit 2 for subjecting the thus exposed film to the steps of developing, fixing, rinsing and drying.

On said camera unit 1, there is provided an automatic original feeder 3, wherein originals 5 such as personal checks, securities or other business forms are stacked in a container 6. Said feeder is further provided with a rocking lever 7 for advancing the originals sheet by sheet from said container, an original feed solenoid 8 for actuating said lever 7, and a spring 9 linked to an end of said lever 7. Upon actuation of said solenoid 8, the lever 7 performs a rocking motion against the tension of the spring 9 to engage with the lowermost one of the originals contained in the container 6 thereby advancing said original to an illuminating station 15.

An original detector 10 composed of a microswitch is provided for detecting the presence of originals in the container 6, providing a logic-1 signal upon said detection for controlling said solenoid 8. The original 5 supplied from the container 6 is advanced by a pair of rollers 16 in the illuminating station 15 to a photographing position between two separated glass plates 17, 18, then exposed on a photographic film and ejected by a pair of eject rollers 19 to a tray 20.

The upper one of said feed rollers 16 is rendered vertically displaceable and is pushed upwards upon arrival of the original between said paired feed rollers, whereby an original feed detector 25, composed of a microswitch, is actuated to release a logic-1 signal, which is continued until the trailing end of the original passes through the photographing position.

In FIG. 1 there are also shown slits 21 positioned close to the photographing position, and lamps 22 for illuminating the original.

The rollers 16 and 19 are linked to a drive source (not shown) and are driven at a constant speed upon turning on of the power supply. The photographing station 29 comprises an imaging lens 30, a shutter 31 and a slit 32. The original 5 is projected, upon passing through the photographing position, by the imaging lens 30 onto a microfilm F in the exposure position of the photographing station 29, thus exposed in a slit form on said film. The shutter 31 is actuated by the output signal from said detector 25.

Said microfilm F, composed of a known silver halide photographic film, is supplied from a supply reel 33 to a storage chamber 50 by a capstan roller 35 and a pinch roller 36 provided in said exposure position. The capstan roller 35 is linked through a solenoid clutch to an unrepresented drive source to drive the film at a speed the same as the displacing speed of the original image at the surface of said roller when the clutch is actuated by the original feed detector 25. The photographic film is not limited to the above-mentioned type but can be of many other types.

A cutter 45 for cutting the film is composed of a fixed blade 45-1 and a movable blade 45-2 actuated by an unrepresented solenoid. The storage chamber 50 has a rectangular shape and is provided with a pair of eject rollers 52 in the vicinity of the exit. The exposed film is supplied by the capstan roller 35 to said storage chamber and is then ejected therefrom by said rollers 52, whereby a film loop F' being formed in said storage chamber by the difference of film feeding between said capstan roller 35 and the eject rollers 52. 53 and 54 represent guide plates for the film.

Figure 2:
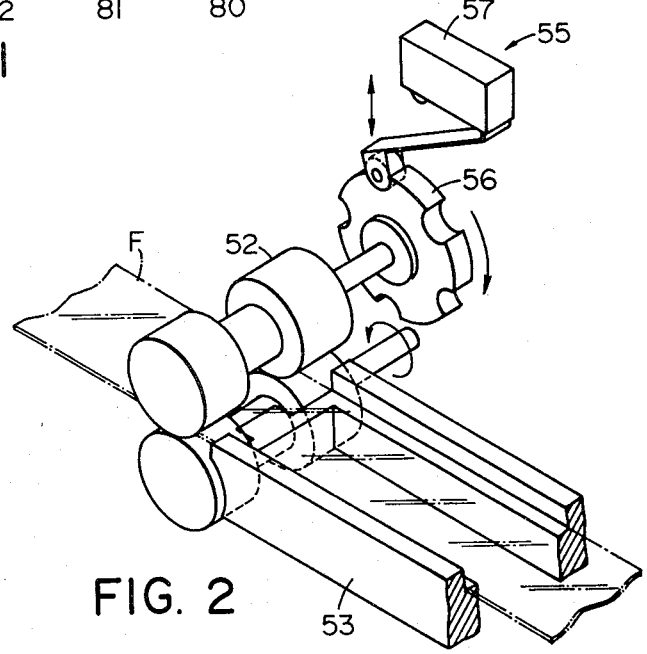
FIG. 2 is a perspective view of a pulse generator.

Referring to FIG. 2, there is shown a first pulse generator 55 for generating a pulse signal for every rotation of the eject roller 52 by a determined angle. Said first pulse generator 55 is composed of a disc 56 fixed on the shaft of said eject roller 52 and a microswitch 57 to be actuated by projections provided at regular intervals along the periphery of said disc 56. On the other hand the capstan roller 35 is also provided with a similar second pulse generator for generating a pulse signal for every rotation of the capstan roller 35 by a determined angle. These pulse generators are not necessarily limited to the above-explained type but can be composed of other known structures. Said first and second pulse generators are so structured as to generate a pulse signal when a determined amount of film is advanced by the roller 52 or 35. The eject rollers 52 are linked, through a solenoid clutch, to an unrepresented drive source of the processing unit, thereby feeding the film from the storage chamber 50 to the processing unit at a speed the same as the film drive speed therein when solenoid clutch is activated.

In the processing unit there are shown film guide plates 60-66, a developing station 80, rinsing stations 81, 82 and a dryer 83. The film F supplied from the camera unit 1 to the processing unit 2 is advanced by feed or drive rollers 84, then developed with a developer in the developing station 80, then rinsed with water in the rinsing stations 81, 82, further dried with hot air in the dryer 83 and ejected by eject rollers 85 onto a tray 86. In said developing station 80 and rinsing stations 81, 82 there are respectively provided feed drums 90, 91, 92 suitably linked to a drive source and serving to advance said film. The developer contained in said developing station 80 is a mono-bath developer which functions as a developing solution to develop the image to a certain density and then as a fixing solution to fix the thus developed image. It is also possible to employ a two-bath processing in which the film is at first developed with a developing solution and then is fixed with a fixing solution. The feed rollers 84, eject rollers 85 and drums 90, 91, 92 are driven by an unrepresented drive source of the processing unit to advance the film at a determined speed.

95 is a take-up reel for winding the processed film. In the present embodiment the film advancing speed is selected larger in the processing unit than in the camera unit, but it can also be selected equal in both units or larger in the camera unit.

Figure 3:
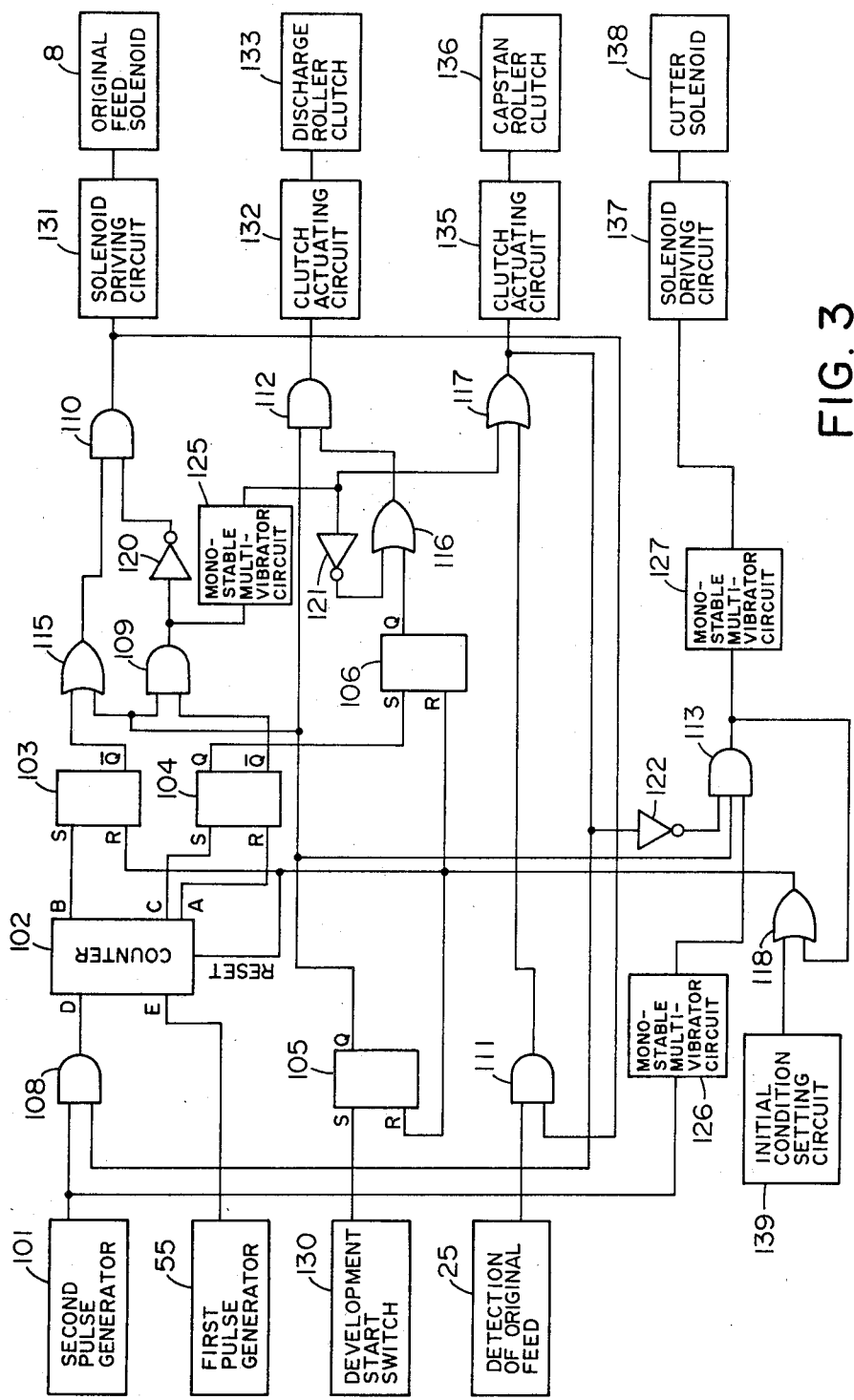
FIG. 3 is a block diagram of the control circuit for the camera shown in FIG. 1.

FIG. 3 shows a control circuit for controlling the functions of the above-explained processor-camera, wherein 55 is the aforementioned first pulse generator which generates a pulse signal for every rotation of the eject rollers 52 by a determined angle, while 101 is the aforementioned second pulse generator for generating a pulse signal for every rotation of the capstan roller 35 by a determined angle. Also there are shown an add-subtract counter 102 for measuring the film amount in the storage chamber, flip-flops 103-106, AND gates 108-113, OR gates 115-118, inverters 120-122, and monostable multivibrators 125-127. The content of said counter 102 is step increased by the pulses from the second pulse generator 101 to an input port D and is step decreased by the pulses supplied from the first pulse generator 55 to an input port E. Said counter 102 is so structured as to release a logic-1 signal from an output port A to reset the flip-flop 104 when the content there is smaller than or equal to a determined first value, and to release a logic-1 signal from an output port C to set said flip-flop 104 when the content is in excess of said first value. Furthermore, said counter releases a logic-1 signal from an output port B to set the flip-flop 103 when the content reaches a determined second value selected far larger than said first value. A development start switch 130, composed of a manually-operated self-returning switch, is provided for starting the processing of the exposed film stored in the storage chamber 50. The flip-flop 105 is set in response to the actuation of said development start switch 130. Further there are shown a solenoid drive circuit 131 for energizing the original feed solenoid 8, a clutch actuating circuit 132 for activating the eject roller clutch 133 for linking the eject rollers 52 with the drive source therefor, a capstan roller clutch actuating circuit 135 for activating the capstan roller clutch 136 for linking the capstan roller 35 with the drive source therefor, a cutter solenoid drive circuit 137 for energizing the cutter solenoid 138 for actuating the movable blade 45-1 of the cutter 45. The flip-flops 103, 105 and 106 are reset either by an output signal from an initial condition setting circuit 139 or by a logic-1 signal supplied when the AND gate 113 is opened. Also the counter 102 is reset to zero similarly by the output signal of the initial condition setting circuit 139 or by the output signal from the AND gate 113.

Figure 4:
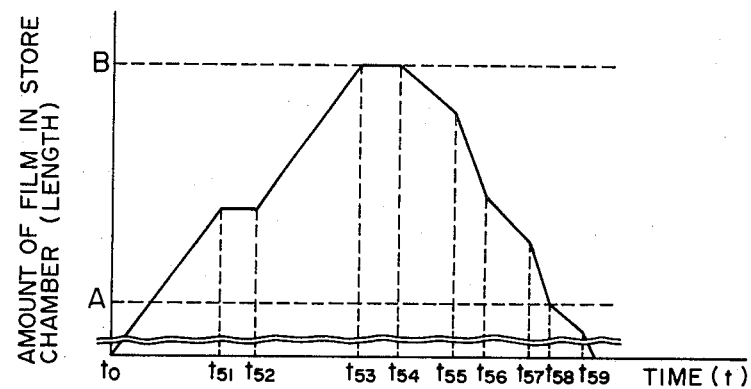
FIGS. 4 to 6 are charts showing the change of the film amount in the storage chamber.
Figure 5:
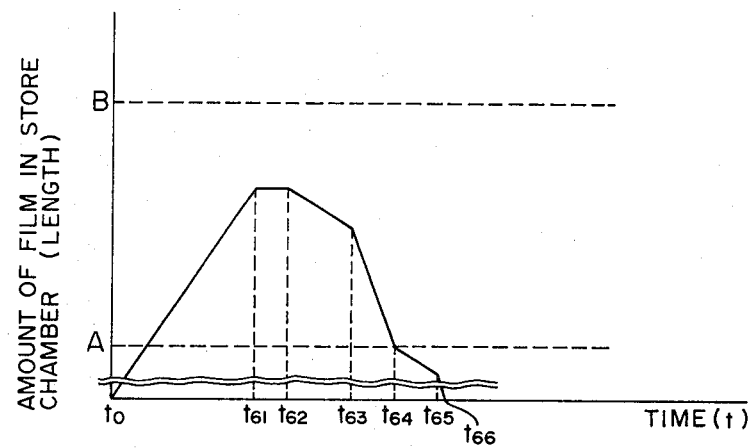
Figure 6:
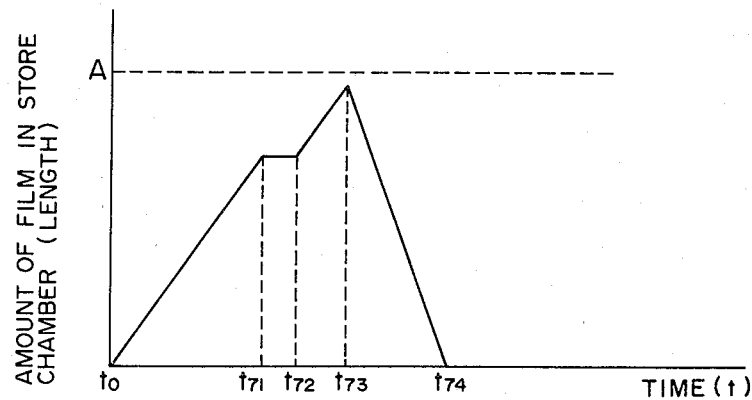

FIGS. 4 to 6 illustrate the change of the amount of film stored in the storage chamber during the photographing operation with the above-explained processor-camera, wherein said film amount and time being respectively indicated in the ordinate and the abscissa.

Now there will be given an explanation on the function of the above-explained processor-camera, while making reference to FIGS. 4 to 6.

Referring to FIG. 1, prior to starting the photographing operation the cover of the camera unit is opened and the leading end of the film F is manually extracted from the supply reel 33, threaded between the capstan roller 35 and pinch roller 36 and further between the eject rollers 52 through the storage chamber 50, in such a manner that said leading end of the film slightly protrudes from the exit side of the eject rollers 52 and that the amount of film loop present in the storage chamber is minimum. The cover of the camera unit is closed after the above-mentioned loading procedure. Upon turning on of the power supply the lamps 22 are lighted and the developer is heated with a heater. Also the drive sources in the camera unit 1 and the processing unit 2 initiate the rotation of the drive roller 84 and drums 90, 91, 92, but the film F remains stationary as the originals 5 are not loaded in the container 6 and the development start switch 130 is not actuated. Also upon turning on of the power supply the counter 102 is reset to zero, thus indicating the minimum loop state in the storage chamber. Further simultaneously the flip-flops 103-106 are reset.

The AND gate 110 is opened by said resetting of the flip-flops 103–105 to enable the energization of the original feed solenoid 8 through the solenoid drive circuit 131. This state is called the start state. In said start state, upon charging the originals 5 into the container 6 at the time $t_0$ shown in FIG. 4, the solenoid 8 is energized through the solenoid drive circuit 131 by the output signal from the original detector 10 to advance an original 5 to the illuminating station 15. In response to the detection of said original by the original feed detector 25, the shutter 31 is opened and the AND gate 111 and OR gate 117 are opened to actuate the capstan roller clutch 136 through the clutch actuating circuit 135 thereby advancing the film F by the capstan roller 35. In this manner the original and the film are synchronously advanced to record the original on said film.

During this photographing operation, corresponding to the rotation of the capstan roller 35, the second pulse generator 101 generates pulse signals which are added to the content of the counter 102 through the AND gate 108. The solenoid 8 continues to be energized at regular intervals until the photographing termination signal to be explained later. Thereafter the originals are photographed in succession on the film, and the content of the counter 102 progressively increases with the increase of the amount of film stored in the storage chamber 50. During a period from $t_{51}$ to $t_{52}$ the photographing operation is interrupted as the container 6 no longer contains the originals. After the re-start of the photographing operation at a time $t_{52}$ with new originals placed into the container 6, the amount of film stored in the storage chamber further increases to reach a determined value B at the time $t_{53}$, whereby the counter 102 releases a signal from the output port B thereof to set the flip-flop 103. As the result the AND gate 110 is closed to release a photographing termination signal, whereby the original feed solenoid 8 is deactivated to terminate the photographing operation even during the presence of the output signal from the detector 10. Said detector amount B is selected as the maximum film storage capacity not causing damage to the film by the wall of the storage chamber or between the films. After the termination of the photographing operation, the development start switch 130 is actuated at the time $t_{54}$ to set the flip-flop 105, whereby the AND gate 112 is opened to activate the eject roller clutch 133 through the clutch actuating circuit 132, thus feeding the film from the storage chamber to the processing unit 2 by the eject rollers 52 to initiate the processing operation. Also simultaneously with the setting of the flip-flop 105, the AND gate 110 is opened again to enable the photographing operation. In this manner the photographing can be restarted without cutting the film even after the storage chamber becomes full, so that any desired amount of originals can be recorded on the same strip film.

In response to the rotation of the eject rollers 52, the first pulse generator 55 generates pulse signals which are subtracted from the content of the counter 102. As the film stored in the storage chamber is ejected to the processing unit 2 from the time $t_{54}$, the amount of said stored film progressively decreases with the corresponding reduction of the content of the counter 102. Although the film supply to the storage chamber and the film ejection therefrom are simultaneously conducted after the time $t_{54}$, the amount of film stored in said storage chamber progressively decreases after the actuation of the switch 130 since said film ejection is faster than the film supply. It is assumed that the photographing operation is interrupted from the time $t_{55}$ to $t_{56}$, during which the amount of the film stored in the storage chamber decreases with a faster rate. After the completion of the photographing operation of a desired amount at the time $t_{57}$, the film amount stored in the storage chamber reaches a determined amount A, selected larger than the minimum storage amount, at the time $t_{58}$, whereby the counter 102 releases a signal from the output port A thereof to reset the flip-flop 104 which was previously set by the signal from the output port C of the counter 102 when the stored film amount exceeds said determined amount A during the foregoing photographing operation. By said resetting of the flip-flop 104 the AND gate 109 is opened to actuate the monostable multivibrator 125, and to close the AND gate 110 to prohibit the photographing operation by the photographing termination signal therefrom. Also the output signal of said monostable multivibrator 125 activates the capstan roller clutch 136 through the clutch actuating circuit 135 to advance the film through the photographing station 29 without exposure. Said monostable multivibrator is designed to function for at least a period during which the film is advanced over a distance corresponding to the film path length from the position of the finally exposed frame of the film to the cutting position of the cutter 45. Consequently, after the termination of the photographing operation at the time $t_{58}$, the capstan roller 35 advances the film without exposure by a length enough for displacing the finally exposed frame of the film to the cutting position of the cutter 45, and is then stopped at the time $t_{59}$. However, the eject rollers 52 continue to rotate even after the time $t_{59}$ extract to the film through the storage chamber 50, whereby the capstan roller is driven to generate pulse signals from the second pulse generator 101. At this point the finally exposed frame of the film has already passed the position of the cutter 45. Said pulse signals activate the monostable multivibrator 126 to open the AND gate 113, of which output signal in turn activates the monostable multivibrator 127 to energize the cutter solenoid 138 through the cutter drive circuit 137 thereby cutting the film. The strip film thus cut is subsequently forwarded to the processing unit 2, and discharged then to the tray 86 after the processing. Also the output signal of the AND gate 113 resets the counter 102 and flip-flops 103–106 to return the processor-camera to the aforementioned start state. In this manner the related originals of a group can all be recorded on a single strip film, whereby it is rendered possible to simplify the information handling thereafter and to reduce the entire work time.

In the foregoing embodiment the film cutting is conducted by the pulse signals from the second pulse generator after the film is tensioned in the storage chamber, and this is in order to prevent the erroneous film cutting before the finally exposed frame of the film passes through the cutter position even when the film is initially loaded with a loop in the storage chamber. Also said film cutting takes place after the finally exposed frame even when the number of pulses generated by the first pulse generator 55 does not exactly correspond to the actually advanced film length due to eventual slippage between the eject rollers 52 and the film, since said film cutting is controlled by the pulse signals generated by the second pulse generator 101 after the film amount in the storage chamber reaches the minimum amount.

Furthermore, at the start of the subsequent photographing operation for the originals of a second group, the storage chamber contained the minimum amount of film in the tensioned state, so that the content of the counter 102 exactly corresponds to the amount of stored film even if said counter does not show exact correspondence in the preceding photographing operation for the originals of the first group.

In the following there will be given an explanation on the function when the development start switch is actuated before the film amount in the storage chamber reaches the determined amount B. Referring to FIG. 5, in response to the actuation of the development start switch 130 at the time $t_{61}$ before the film amount in the storage chamber reaches the aforementioned determined amount B, the eject rollers 52 initiate rotation to advance the film from the storage chamber to the processing unit 2. In this state the photographing operation is not prohibited. After the re-start of the photographing operation at the time $t_{62}$ and the completion thereof for originals of a group at the time $t_{63}$, the film amount in the storage chamber reaches the determined amount A at the time $t_{64}$, whereby the photographing operation being prohibited by the output signal from the AND gate 110 and the film being advanced without exposure by the capstan roller 35. Thereafter the film is cut in a similar manner as explained in the foregoing, and the apparatus is returned to the start state. In this manner it is again possible to obtain a strip film limited to the related information even when the number of originals in a group is small.

In the foregoing embodiment the photographing operation is prohibited when the film amount in the storage chamber reaches a determined amount A larger than the minimum amount because, if the photographing operation is continued until the film amount in the storage chamber reaches the minimum value, the photographing operation and the film ejection to the processing unit proceed simultaneously with the minimum amount of film in the storage chamber, eventually affecting the film advancement in the photographing station and hindering the normal photographing of the originals due to the difference in the film advancing speed between the camera unit and the processing unit.

Finally there will be explained the function of the apparatus when the development start switch is actuated when the film amount in the storage chamber is less than the aforementioned determined amount A. Referring to FIG. 6, in response to the actuation of the development start switch 130 at the time $t_{72}$ wherein the film amount in the storage chamber is less than said determined amount A in the course of photographing operation, the AND gate 109 is opened to close the AND gate 110 thereby prohibiting the photographing operation. Simultaneously the monostable multivibrator 125 is activated to advance the film without exposure by the capstan roller 35. On the other hand the eject rollers 52 are not rotated by the actuation of said switch 130 since the AND gate 112 is closed in this state. Consequently the stored film amount gradually increases. After the film is advanced by an amount enough for displacing the finally exposed frame to the cutter 45, the monostable multivibrator 125 is deactivated to terminate the rotation of the capstan roller 35. Simultaneously the AND gate 112 is opened to activate the eject rollers 52 at the time $t_{73}$, thereby advancing the film from the storage chamber to the processing unit. The film in the storage chamber thus decreases progressively and finally becomes tensioned in the storage chamber to extract the film from the photographing station, whereby the capstan roller 35 being rotated to generate pulse signals from the second pulse generator 101. In response to said pulse signals the monostable multivibrator 126 is activated to open the AND gate 113, thereby actuating the cutter 45. In this manner, in case the development start switch is actuated when the film amount in the storage chamber is less than a determined amount, the film is supplied to the processing unit after film advancement without exposure, thereby avoiding the drawback of film cutting in front of the finally exposed frame which may occur when the film is discharged from the storage chamber to the processing unit simultaneously with the actuation of the development start switch.

What we claim is:

1. A recording apparatus, comprising:
means for recording an image on a long length of film at an exposure station;
storage means for storing, in a loop, the film transported from the exposure station;
means for developing the film fed from said storage means;
means for feeding the film from said storage means to said developing means;
manual switching means (130);
means for keeping said feeding means inoperative to prevent it from feeding the film stored in said storage means to a developing portion of said developing means until said switching means is actuated, and for permitting, responsive to said switching means, the operation of the feeding means for feeding the film to the developing portion;
means for halting the operation of said recording means when the amount of the film in said storage means reaches a predetermined amount;
means, responsive to said switching means, for releasing the recording means from said halting means;
means for cutting the film; and
means for operating said cutting means to cut the film after said switching means is actuated.

2. An apparatus according to claim 1, further comprising:
second feeding means for feeding the film from the exposure station to said storage means;
feed control means for operating said second feeding means to feed the film to said storage means when the amount of the film in said storage means reaches a second predetermined amount after said switching means is actuated, and for stopping said second feeding means when the predetermined amount of the film is fed to said storage means by said second feeding means after said switching means is actuated; and
means for actuating said cutting means when the predetermined length of film is fed to said storage means after the operation of said switching means.

3. An apparatus according to claim 1, wherein said recording means includes means for recording an image of a moving original on the film which is moving in synchronism with the moving original.

4. An apparatus according to claim 3, wherein said recording means includes means for transporting the original to the exposure station, and wherein said halting means also halts the operation of said original transporting means.

5. A recording apparatus, comprising:

means for recording an image on a long length of film at an exposure station;

storage means for storing, in a loop, the film transported from the exposure station;

means for developing the film fed from said storage means;

means for feeding the film from said storage means to said developing means;

manual switching means;

means for keeping said feeding means inoperative to prevent it from feeding the film stored in said storage means to a developing portion of said developing means until said switching means is actuated, and for permitting the operation of the film feeding means for feeding the film to the developing portion in response to said switching means;

means for cutting the film;

cutting control means for operating said cutting means to cut the film after said switching means is actuated; and recording control means for preventing the operation of said recording means when the amount of the film in said storage means reaches a predetermined amount after said switching means is actuated, and for enabling the operation of said recording means when the amount of the film in said storage means reaches the predetermined amount before said switching means is operated.

6. An apparatus according to claim 5, further comprising:

second feeding means for feeding the film from the exposure station to said storage means; and feed control means for operating said second feeding means to feed the film when the amount of the film in said storage means reaches the predetermined amount after said switching means is actuated, and for stopping said second feedings means, whereby said cutting control means operates said cutting means when the predetermined amount of the film is fed by said second feeding means.

7. A recording apparatus, comprising:

means for recording an image on a long length of film at an exposure station;

means for storing, in a loop, the film transported from the exposure station;

first feeding means for feeding the film from said storage means to a developing means;

manual switching means;

second feeding means for feeding the film from the exposure station to said storage means;

means, responsive to said switching means, for actuating said first feeding means to feed the film to said developing means;

means for preventing the recording operation of said recording means in response to actuation of said switching means; and means for operating said second feeding means to feed the film to said storage means in response to actuation of said switching means, and for stopping said second feeding means when a predetermined amount of the film is fed by said second feeding means after said switching means is actuated.

8. An apparatus according to claim 7, further comprising means for actuating said first feeding means to feed the film to the developing means when the predetermined length of the film is fed to said storage means after operation of said switching means.

* * * * *